A. G. ELVIN.
FLEXIBLE PIPE JOINT.
APPLICATION FILED JUNE 5, 1908.
946,025.
Patented Jan. 11, 1910.
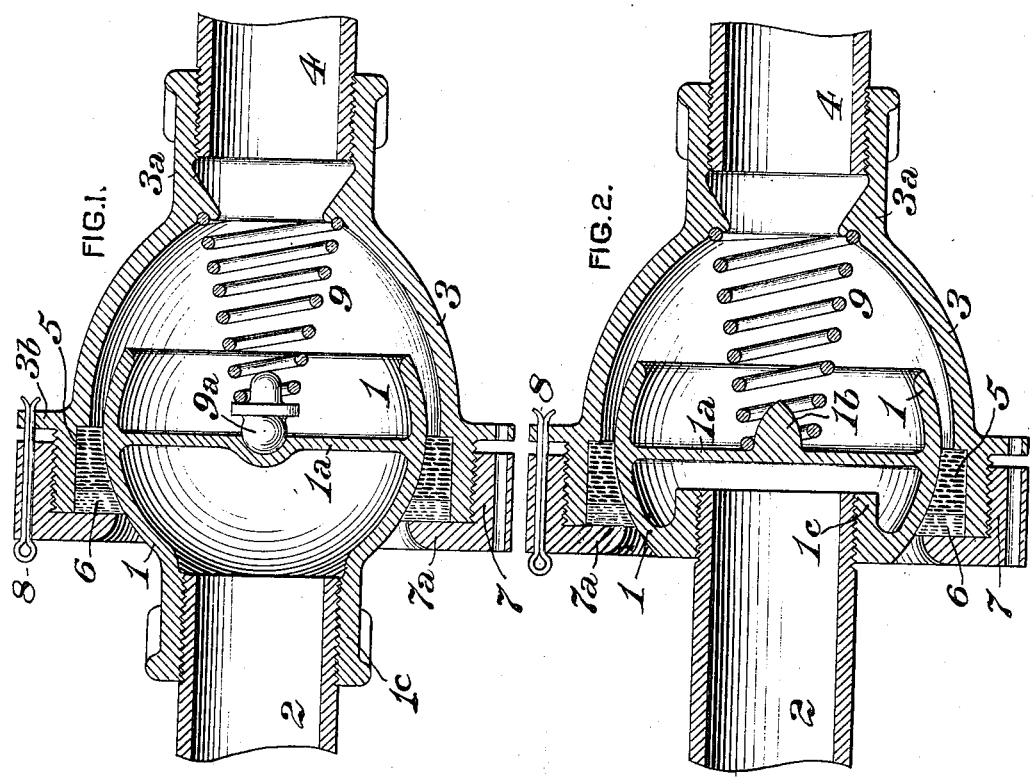
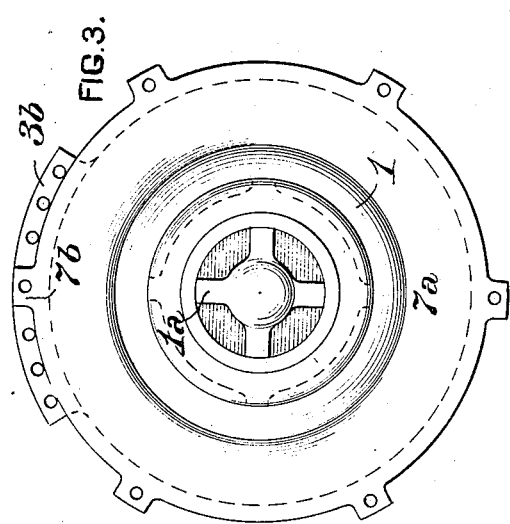
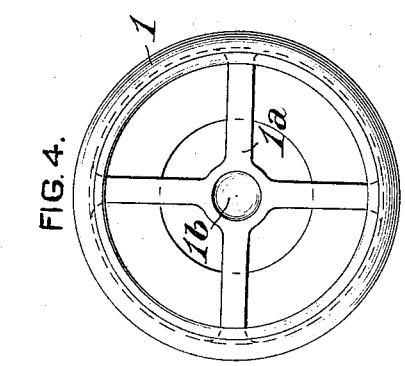
WITNESSES
INVENTOR

UNITED STATES PATENT OFFICE.

ALBERT G. ELVIN, OF FRANKLIN, PENNSYLVANIA.

FLEXIBLE PIPE-JOINT.

946,025.

Specification of Letters Patent. Patented Jan. 11, 1910.

Application filed June 5, 1908. Serial No. 436,820.

*To all whom it may concern:*

Be it known that I, ALBERT G. ELVIN, of Franklin, in the county of Venango and State of Pennsylvania, have invented a certain new and useful Improvement in Flexible Pipe-Joints, of which improvement the following is a specification.

My invention relates to joints for the connection of sections of pipes with the capacity of relative movement without leakage of fluid, and its object is to provide a joint of such type in which both tightness and flexibility shall be assured, the life of the packing gasket prolonged, and the action of the tightening spring more effectively exerted than heretofore.

The improvement claimed is hereinafter fully set forth.

In the accompanying drawing: Figure 1 is a longitudinal central section through a flexible pipe joint embodying my invention; Fig. 2, a similar section showing modifications of structural detail; Fig. 3, an end view of the joint of Fig. 1, as seen from the left, and; Fig. 4, a view, in elevation, of the ball member of Fig. 2, as seen from the right.

In the practice of my invention, I provide a ball or internal member, 1, which is internally threaded at one end for connection to a pipe section, 2, and a socket or external member, 3, having an internally threaded nozzle, 3ª, at its end farther from the ball member, for connection to a pipe section, 4. The opposite end of the socket is entirely open, and is recessed cylindrically to receive an inner packing gasket, 5, of the material usually employed, as composition or rubber, which fits truly between the periphery of the ball and the bore of the recess of the socket, and abuts against the inner end of said recess, and an outer wear gasket, 6, of soft material, which similarly fits between the ball and the bore of the recess, at and adjoining the outer end of the latter, and abuts against the packing gasket. The ball and the packing and wear gaskets are held in position in the socket by a nut, 7, engaging an external thread on the socket, and having an inwardly extending annular flange, 7ª, abutting against the outer side of the wear gasket, 6. The nut, 7, is locked in position after being screwed up to a proper bearing, by a split pin or cotter, 8, passing through a hole in one of a set of peripheral lugs, 7ᵇ, on the nut, and through one of a set of holes in a flange, 3ᵇ, on the socket.

The ball, 1, is pressed up to the packing and wear gaskets, 5 and 6, with sufficient force to prevent leakage of fluid between its outer surface and said gaskets, and to prevent lost motion and rattling when there is no pressure within the joint, and when the apparatus in which the joint is applied is subjected to shocks and jars, as in the case of locomotives, by a conical spiral spring, 9, which it abuts, at its larger end, on a seat in the socket, 3, and, at its opposite end, is pivoted centrally to a spider or skeleton frame, 1ª, extending across the ball. As shown in Fig. 1, the smaller end of the spring abuts against a collar on a spherical faced pivot, 9ª, fitting in a corresponding central recess in the spider, 1ª, and, in Fig. 3, it is shown as encircling a central pivot 1ᵇ, formed integral with the spider.

The ball of Fig. 1 is provided with a projecting internally threaded nozzle, 1ᶜ, similar to the nozzle, 3ª, of the socket, for the attachment of the pipe section, 2, while in Fig. 2, this extension or outwardly projecting nozzle is dispensed with, and an inwardly projecting and internally threaded hub, 1ᶜ, is formed on the ball, for engagement with the pipe section, thereby rendering the appliance more compact and permitting a greater range of movement of the ball, and, consequently, greater flexibility of the joint.

It will be seen by those familiar with joints of the general type to which my invention relates, that the soft metal wear ring will, soon after application, wear to an absolutely tight joint with the ball, and will relieve the excessive wear upon the packing gasket, which has always been a material objection in this class of joints. The resultant advantage in prolonging the life of the packing gasket and preventing leakage will readily appear. A further advantage of my improvement consists in the centrally pivoted spring, by which a more uniform distribution of pressure over the entire gasket is effected than is practicable in the ordinary constructions.

I claim as my invention and desire to secure by Letters Patent:

1. In a flexible pipe joint, the combination of a ball member, a socket member free of said ball member and having a recess, each of said members being fitted for connection to a section of pipe, a packing gasket fitting between the recess in the socket and the periphery of the ball, an outer wear gasket, of soft metal, similarly fitting and adjoining the outer side of the packing gasket and contacting with said ball member, and a conical spring, abutting, at its larger end, on the wall of the socket, and pivoted centrally to the ball at its opposite end.

2. In a flexible pipe joint, the combination of a ball member, a socket member free of said ball member and having a recess, one of said members having an internally projecting threaded hub and the other being internally threaded for connection to a section of pipe, a packing gasket fitting between the recess in the socket and the periphery of the wall, an outer wear gasket, of soft metal, similarly fitting and adjoining the outer side of the packing gasket and contacting with said ball member, and a conical spring abutting, at its larger end, on the wall of the socket, and, at the other, in the center of the ball.

3. In a flexible pipe joint, the combination of a ball member, a socket member free of said ball member and having a recess, each of said members being fitted for connection to a section pipe, a packing gasket fitting between the recess in the socket and the periphery of the ball, an outer wear gasket, of soft metal, similarly fitting and adjoining the outer side of the packing gasket and contacting with said ball member, a conical spring, abutting, at one end, on the wall of the socket, and, at the other, on the ball, a nut engaging an external thread on the socket and bearing on the outer side of the gasket, and a locking cotter passing through one of a plurality of holes in the socket and through a hole in the nut.

ALBERT G. ELVIN.

Witnesses:
WM. T. LANE,
B. A. KRENZ.